Figure 1:
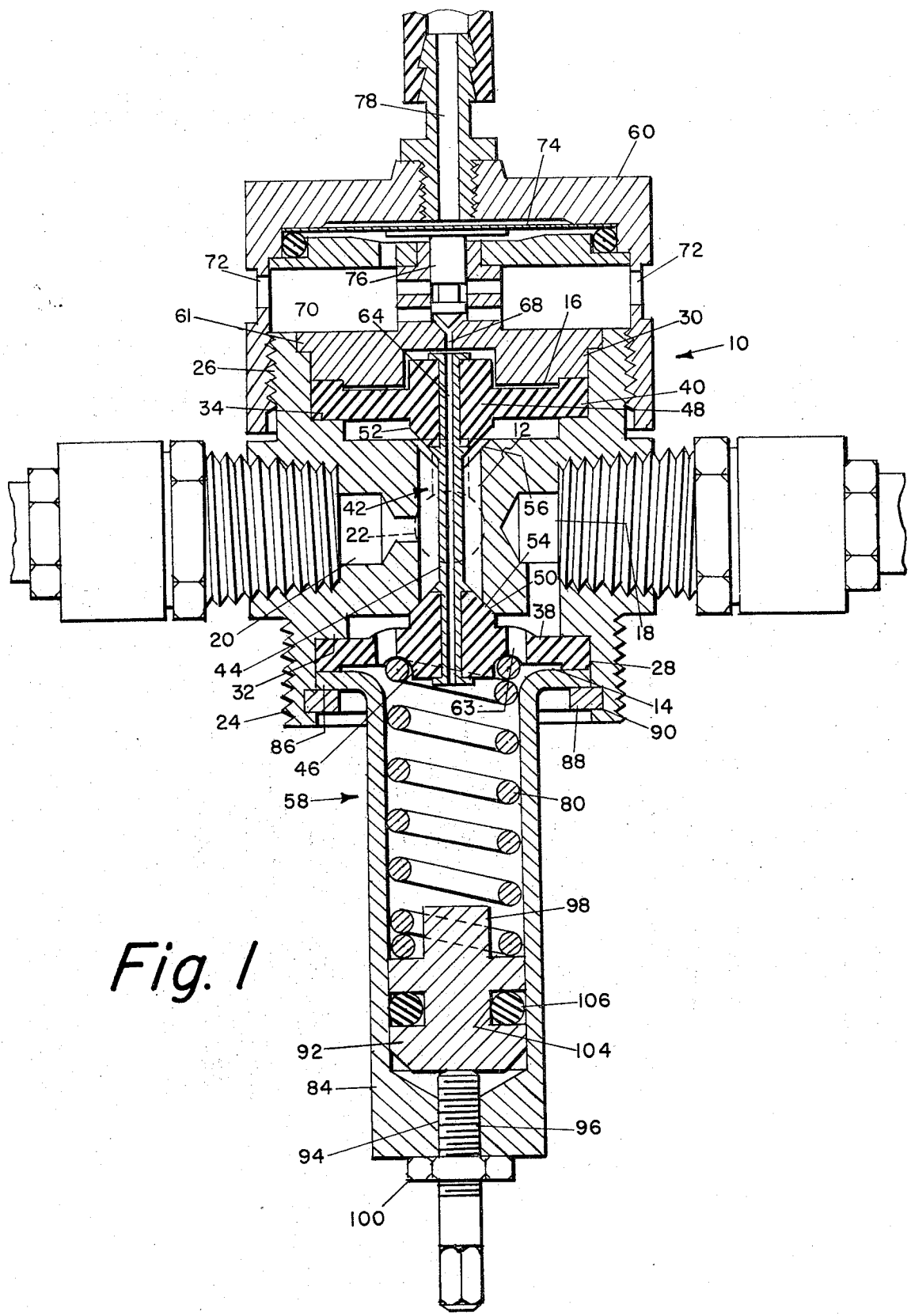

United States Patent [19]

Trusselle

[11] 3,768,515

[45] Oct. 30, 1973

[54] PNEUMATIC RELAY VALVE FOR FILLING APPARATUS

[75] Inventor: William H. Trusselle, Braintree, Mass.

[73] Assignee: Pneumatic Scale Corporation, Quincy, Mass.

[22] Filed: Feb. 9, 1972

[21] Appl. No.: 224,872

Related U.S. Application Data

[63] Continuation-in-part of Ser. No. 186,031, Oct. 4, 1971.

[52] U.S. Cl. .......................................... 137/625.6
[51] Int. Cl. ........................................... F16k 31/385
[58] Field of Search................. 137/625.66, 625.6, 137/625.64, 625.27; 251/43, 28, 61.3

[56] References Cited
UNITED STATES PATENTS 3,010,438   11/1961   Fife et al. ..................... 137/625.66
3,470,910   10/1969   Loveless ........................ 137/625.6
3,592,235   7/1969    Fore ............................. 137/625.66
3,529,629   9/1970    Cowan .......................... 137/625.6
3,670,771   6/1972    Dewberry ..................... 137/625.6

FOREIGN PATENTS OR APPLICATIONS 935,951   12/1955   Germany ...................... 137/625.6

Primary Examiner—Henry T. Klinksiek
Assistant Examiner—Robert J. Miller
Attorney—Robert T. Gammons

[57] ABSTRACT

A pressure operable valve in which a valve element is supported by diaphragms for movement relative to valve seats, wherein the diaphragms are designed to bias the valve element to a closed position, a coil spring is disposed with an end engaged with one of the diaphragms to supplement said biasing, and a part supported against the other end of the spring is operable to vary the pressure applied to the valve element by said spring.

4 Claims, 2 Drawing Figures

PNEUMATIC RELAY VALVE FOR FILLING APPARATUS

BACKGROUND OF THE INVENTION

This application is a continuation-in-part of my pending U.S. application for Pat. Ser. No. 186,031, filed Oct. 4, 1971.

Diaphragm valves are employed in pneumatically controlled filling apparatus because the moving parts have very little inertia and so will respond quickly to pressure signals. One such valve is disclosed in conjunction with the filling machine described in the aforesaid application. The valve disclosed is of the type wherein the valve element is shifted by a pressure differential at its ends from closed to open positions and vice versa. As constructed, the diaphragm at one end is ported and the diaphragm at the other end is imperforate. A small diameter passage extends through the valve element through which pressure delivered through the ports in the one diaphragm to the outer side thereof is conducted to the outer side of the other diaphragm to hold the valve element open. The valve element is shifted to its closed position by venting the outer side of said other diaphragm. It is customary in such valves to prestress the diaphragms to bias the valve element to a closed position and to supplement such biasing by means of a spring supported in engagement with the outer side of said one diaphragm. Valves of this type are very sensitive; however, they are uncertain in their operation due to the fact that the flow passages therein are of such small diameter that it is impossible to maintain identical manufacturing tolerances from one valve to another; because the durometer, thickness and resiliency of the opposed diaphragms cannot be made sufficiently uniform to insure identical performance and because the springs employed to assist in biasing the valves to a closed position cannot be manufactured to close enough tolerances to produce the same performance from valve to valve. These factors together with the accumulation of residual pressures in the system result in unreliability in operation. Such valves may shift in either direction in response to pressures anywhere from 0.1 inches of water to 0.6 inches of water and so each valve must be separately calibrated before it can be used, otherwise it may or may not shift at a given predetermined pressure and at said pressure it may flutter, alternately opening and closing. Such conditions cannot be tolerated in filling apparatus where the cut-off of the filling operation has to be precise. The purpose of this invention is to provide a diaphragm valve of the foregoing kind which will embody the sensitivity desired and will be positive in its response within a specific minimum pressure range without premature or late operation and without having to be custom-built for the system within which it is to be used.

SUMMARY

A relay of the kind comprising a valve body containing an axially elongate chamber within which is supported for axial movement a valve element, said chamber having intermediate and end chambers, valve seats at the junctions of the ends of the intermediate chamber and the end chambers, a valve element, diaphragms in said end chambers supporting the valve element for axial movement relative to said valve seats, ports in communication with the respective end chambers and the intermediate chamber, the port in the intermediate chamber being adapted to be alternately connected to one or the other of the ports in the end chambers according to the disposition of the valve element, said valve element containing an axial passage through which pressure entering an end chamber outside of the diaphragm is adapted to be conducted to the outer side of the diaphragm in the other end chamber, a port in the diaphragm in the one end chamber, the diaphragm in the other end chamber being imperforate such that pressure supplied to the end chamber outwardly of the diaphragm in the one chamber will shift the valve element to a position to provide communication between the port at the one end and the port in the intermediate chamber, a spring opposing such displacement, and means for adjusting the resistance of the spring to such displacement. The spring is supported with one end in engagement with the diaphragm in the one chamber by a sleeve closed at one end and open at the other, mounted on the valve body with the open end in communication with the end chamber. A block is mounted in the sleeve at the closed end for axial movement therein, the opposite end of the spring being seated thereagainst and a screw is threaded into a hole in the closed end against the block and is operable by rotation to move the block axially within the sleeve to adjust the spring pressure on the diaphragm.

Figure 2:
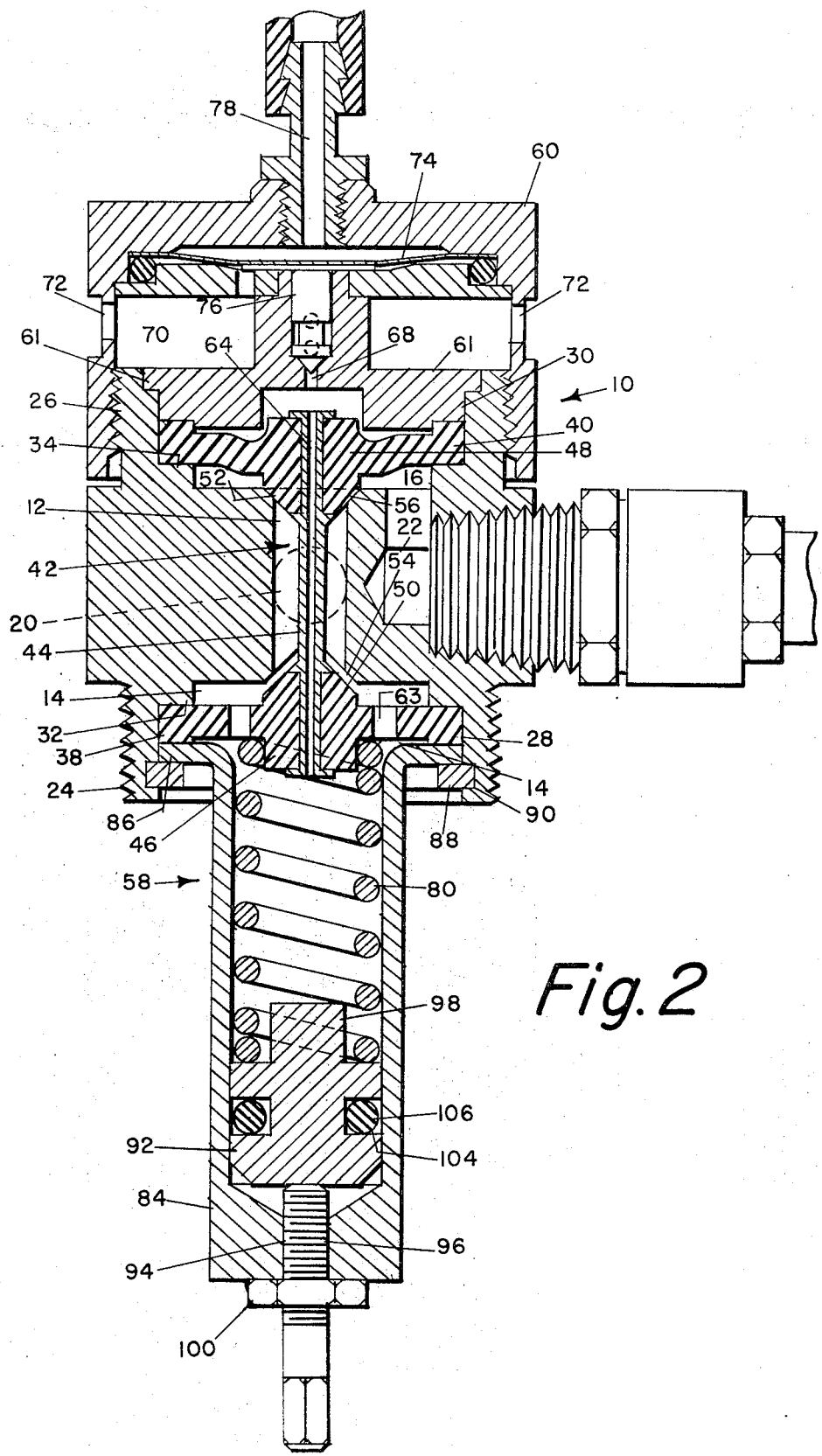

The invention will now be described with reference to the accompanying drawings wherein:

FIG. 1 is an enlarged diametrical section of the valve showing the valve in its closed position; and FIG. 2 is a corresponding section showing the valve in its open position.

Referring to the drawings, the relay comprises a valve body 10 of generally cylindrical cross-section whithin which there is an axially elongate valve chamber comprising an intermediate chamber 12 and end chambers 14 and 16. The valve body has radially disposed ports 18, 20 and 22. The port 18 comprises the inlet for pressure, the port 20 the outlet for pressure which is to be transmitted through the valve for operational purposes, and the port 22 is an exhaust port.

The valve body is threaded at its opposite ends at 24 and 26 respectively, and contains circular openings 28 and 30 at the bottoms of which there are annular shoulders 32 and 34, the openings comprising the end chambers 14 and 16 referred to above. Diaphragms 38 and 40 are supported within the openings 28 and 30 against the shoulders 32 and 34 and these diaphragms in turn support a valve element 42 comprising an elongate spindle 44 of smaller diameter than the intermediate chamber, at the ends of which there are valve heads 46 and 48 provided with conical seat-engaging surfaces 50 and 52. These heads 46 and 48 are supported, respectively, by the diaphragms 38 and 40 and as illustrated the heads and diaphragms are integral, being comprised of a molded elastomer embodying the desired degree of flexibility. At the junction of each end of the intermediate chamber 12 with an end chamber there is a conical-shaped valve seat with which the valve heads 46 and 48 are adapted to be alternately engaged, that is, when one is closed the other is open and vice versa. The valve seats are identified by reference characters 54 and 56 respectively. The diaphragm 46 is confined in the end chamber 14 by the flange of a housing 58 mounted in the opening 28 at this end and the diaphragm 40 is confined in the end chamber 16 by a plate 61 containing a bleeder port mounted in a cap 60 screwed onto the threaded end 26 of the valve body. The threads 24 at the opposite end of the valve body provide for attaching the valve to the part of the apparatus with which it is to be used.

The diaphragm 38 contains one or more ports 63 peripherally of the valve head 46 which are in communication with the inlet port 18 and with that portion of the end chamber 14 outwardly of the diaphragm and provide for balancing the pressure at opposite sides of the diaphragm 38. The diaphragm 40 is imperforate. The spindle 48 contains an axially extending passage 64 of small diameter which extends from end to end thereof, one end being in communication with the chamber 14 outwardly of the diaphragm 38 and the other with the chamber 16 outwardly of the diaphragm 40. Pressure supplied to the chamber 14 through the ports 63 is accordingly transmitted through the axial passage 64 to the chamber 16 outwardly of the diaphragm 40.

The cap 60 contains, as related, a plate 61 which fits into the opening 30 against the diaphragm. The plate 61 contains a centrally located, axially extending bleeder port 68 of small diameter which opens into a bleeder chamber 70 from which extends radial bleeder passages 72—72. In the bleeder chamber there is mounted by means of a flexible diaphragm 74 a bleeder valve 76 which is adapted by engagement with the bleeder port 68 to seal that portion of the end chamber 16 outwardly of the diaphragm 40. The bleeder valve 76 occupies a normally open position, being held in this position by the diaphragm 74 and is moved to a closed position by pressure applied thereto through a port 78 in the end of the cap.

The normal position of the valve element 42 in the absence of pressure supplied to the port 78 is a closed position wherein the valve head 46 engages the seat 54 and in which pressure entering the inlet port 18 enters the end chamber 14 through the port 63, flows through the axial passage 64, the bleeder port 68 and the bleeder ports 72—72 to the atmosphere. In this position of the valve the port 20 is in communication with the port 22 by way of the intermediate chamber 12 and the annular passage between the valve head 48 and its seat 56. Pressure supplied to the port 78 moves the bleeder valve 76 into engagement with the bleeder port 68 thereby closing the end chamber 16 so tat the pressure entering the chamber 16 through the axial passage 64 is confined therein and since the diaphragm 40 is of larger effective area than the diaphragm 38 shifts the valve element to engage the head 48 with its seat 52 and disengages the head 46 from its seat 54. This permits pressure entering the port 18 to enter the intermediate chamber 12 and flow from thence through the port 20 for effecting the operation intended.

The valve element 42 is biased in a direction to hold the valve head 46 against its seat 54, which is the closed position of the valve, by prestressing the diaphragms and by supporting a spring against the diaphragm 38. However, becuase of residual pressures, differences in durometer, thickness and resilience of the diaphragms from valve to valve, the impossibility of machining the flow passages with a tolerance close enough to insure identical performance and the impossibility of duplicating spring performance, it is impossible to obtain two or more valves which will respond to the same pressure since accurate control by means of such valves is impossible. The purpose of this invention is to remedy the foregoing in such a way that any commercial valve of the foregoing kind can be used and will perform accurately within a range of from 0.01 to 0.02 inches of water thus providing for a high degree of sensitivity over a wide range of pressures without premature or late operation and without oscillation at a predetermined pressure.

This is achieved herein by mounting a spring 80 in the housing 58 with one end seated against the diaphragm 38 and the other end seated against a cylindrical block 92 mounted at the distal end of the housing. The housing 58 is an elongate cylindrical sleeve 84 open at one end and closed at the other. The sleeve has at its open end a flange 86 and the latter is held against the diaphragm 38 by a snap ring 88 set into a groove 90 inside the opening 28. The closed end of the sleeve contains a threaded hole 94 in which there is mounted a screw 96, the inner end of which bears against the block 92. The block 92 has a cylindrical projection 98 of smaller diameter than the spring which supports the spring in concentric relation with the axis of the screw so that the block can be moved relative to the spring without distortion while changing the axial length of the spring to increase or decrease its resistance to displacement. Rotation of the screw by movement of the block longitudinally of the sleeve provides for increasing or decreasing the pressure which is applied by the spring. A lock nut 100 provides for fixing the screw in a predetermined position of adjustment. In order to prevent leaking of air through the threaded hole 94 the block 92 is provided with a groove 104 in which there is mounted a sealing ring 106. Preferably the spring 80 is relatively long in proportion to its diameter as to provide for a smooth soft action in contrast to the stiff harsh action of a short spring. The long spring also has the advantage that when making an adjustment the adjusting screw will have to be turned an appreciable amount even for a small adjustment and hence can be readily discerned, for example, on an index scale.

The relay as described is used to control flow of operating pressure. When used for this purpose the port 18 is connected to the source of pressure. Pressure supplied to the port will be blocked until the bleeder valve 76 is closed whereupon the pressure will become operative to shift the valve element in a direction to disengage the valve head 46 from its seat 54 thereby permitting the pressure entering the port 18 to flow directly into the intermediate chamber 12 and from thence through the outlet port 20. The relay as used in the aforesaid pending application operates in the same way but to vent operating pressure from the pressure system employed therein for controlling the filling operation. As thus used the inlet port 18 of the relay is connected to the pressure system of the filling apparatus, — specifically that shown in the aforesaid pending application, and so long as the bleeder valve 76 is held open the valve element will block escape of the operating pressure from the system in sufficient amount to render the system inoperative. A very small flow takes place through the bleeder without affecting the operating pressure. In the aforesaid application when a container becomes filled to a predetermined level it blocks flow of sensing air in a sensing tube and the back pressure developed in the sensing tube is transmitted through a conductor and through the port 78 to the diaphragm 74 of this valve so as to close the bleeder valve. Closing the bleeder valve applies the pressure to the diaphragm 40 so as to shift the valve element thereby to disengage the head 46 from its seat 54 and this allows the pressure in the system to flow into the intermediate chamber 12 and from thence through the outlet port 20 to the atmosphere. When used in this manner the port 22 is not necessary and may either be left open or may be closed by inserting a plug.

FIGS. 1 and 2 illustrating the relay have been drawn to approximately three-times the actual size of the relay in order to be able to clearly identify the component parts and especially to illustrate the flow passages.

It should be understood that the present disclosure is for the purpose of illustration only and that this invention includes all modifications and equivalents falling within the scope of the appended claims.

I claim:

1. A relay comprising a valve body containing an axially elongate chamber within which is supported for axial movement a valve element, said chamber having intermediate and end chambers, valve seats at the junctions of the ends of the intermediate chamber and the end chambers, a valve element, diaphragms in said end chambers supporting the valve element for axial movement relative to said valve seats, ports in communication with the respective end chambers and the intermediate chamber, the port in the intermediate chamber being adapted to be alternately connected to one or the other of the ports in the end chambers according to the disposition of the valve element, said valve element containing an axial passage in communication at its opposite ends with the respective end chambers, a port in the diaphragm in one of the end chambers providing communication between the port at that end and the end of the axial chamber at that end, a bleeder port in communication with the end of the axial passage at the other end, said bleeder port being adapted to be closed to apply pressure entering the port at said one end by way of the axial passage to displace the valve element to a position to provide communication between the port at said one end and the intermediate chamber, a spring opposing such displacement, a sleeve closed at one end and open at the other mounted on the valve body with the open end in communication with the end chamber at that end and in axial alignment with the valve element, said sleeve having at its open end a radially disposed flange for engagement with the periphery of its diaphragm, a retaining ring for clamping the flange to the valve body against said diaphragm, said sleeve containing at its closed end an axially disposed threaded opening, a block mounted in the sleeve at the closed end, said spring being disposed between the block and the diaphragm, and a screw threaded into said threaded opening against said block operable to move the block from said closed end toward the diaphragm to effect compression of the spring and to enable adjusting the resistance of the spring to displacement.

2. A relay according to claim 1, wherein said block has at its inner end a peripheral groove for telescopically receiving the end of the spring.

3. A relay according to claim 1, wherein the block has a sealing ring peripherally thereof for sealing engagement with the inside of the sleeve.

4. A relay according to claim 1, wherein the spring is relatively long in proportion to its diameter.

* * * * *